US009375689B2

(12) United States Patent
Bravo

(10) Patent No.: US 9,375,689 B2
(45) Date of Patent: Jun. 28, 2016

(54) MACHINE FOR THE TREATMENT OF FOOD MIXTURES HAVING SCRAPING AND MIXING BLADES AND A BLENDER DISPOSED PARALLEL THERETO

(75) Inventor: Genesio Bravo, Alte Ceccato-Vicenza (IT)

(73) Assignee: BRAVO S.P.A., Montecchio Maggiore (Vicenza) (IT)

(*) Notice: Subject to any disclaimer, the term of this patent is extended or adjusted under 35 U.S.C. 154(b) by 904 days.

(21) Appl. No.: 13/519,119

(22) PCT Filed: Mar. 17, 2011

(86) PCT No.: PCT/EP2011/001414
§ 371 (c)(1),
(2), (4) Date: Jun. 25, 2012

(87) PCT Pub. No.: WO2011/116931
PCT Pub. Date: Sep. 29, 2011

(65) Prior Publication Data
US 2013/0008321 A1    Jan. 10, 2013

(30) Foreign Application Priority Data

Mar. 25, 2010  (IT) .............................. MI2010A0494
Feb. 25, 2011  (IT) .............................. MI2011A0283

(51) Int. Cl.
*B01F 7/16*     (2006.01)
*A47J 43/07*    (2006.01)
*A23G 9/12*     (2006.01)
(Continued)

(52) U.S. Cl.
CPC . *B01F 7/162* (2013.01); *A23G 9/12* (2013.01); *A23G 9/224* (2013.01); *B01F 7/165* (2013.01); *B01F 7/1665* (2013.01); *A47J 43/07* (2013.01); *A47J 2043/04481* (2013.01);
(Continued)

(58) Field of Classification Search
CPC .. B01F 13/1025; B01F 7/1665; B01F 7/1695; B01F 7/00208; B01F 7/165; A47J 43/07; A47J 2043/04481
USPC ................. 366/299, 314, 309, 312, 331, 129; 99/348
See application file for complete search history.

(56) References Cited

U.S. PATENT DOCUMENTS 3,411,756 A * 11/1968 Ziegler .................. B01F 7/1695
                                                     366/251
3,434,518 A *  3/1969 Motis ...................... A47J 42/56
                                                     241/199.12
(Continued)

FOREIGN PATENT DOCUMENTS

CH       426735 A  * 12/1966  ............. B01F 7/161
CH       641375 A5 *  2/1984  ............ B01F 7/1665
(Continued)

*Primary Examiner* — Charles Cooley
(74) *Attorney, Agent, or Firm* — Themis Law

(57) ABSTRACT

A machine for the treatment of food mixtures with an improved performance includes a container or cylinder for collecting a food mixture, integral with a frame structure and equipped with an upper lid, for closing the container and hinged to the frame, so as to be in a closed or open position on an upper opening of the container, in the container there being a rotating shaft, which is coaxial to the container and which supports in rotation scraping and mixing blades at the bottom and sides of the inner and bottom walls of the container, a blender being positioned in an opening of the lid. Particularly, the blender can be positioned so to be freely removable.

10 Claims, 8 Drawing Sheets

(51) Int. Cl.
  *A23G 9/22* (2006.01)
  *A47J 43/044* (2006.01)
  *B01F 7/00* (2006.01)
  *B01F 13/10* (2006.01)

(52) U.S. Cl.
  CPC ............ *B01F 7/002* (2013.01); *B01F 7/00208* (2013.01); *B01F 13/1025* (2013.01); *B01F 2215/0021* (2013.01)

(56) References Cited

U.S. PATENT DOCUMENTS

| | | | | |
|---|---|---|---|---|
| 3,957,215 A | * | 5/1976 | Otto | A47J 43/046 241/282.1 |
| 4,100,612 A | * | 7/1978 | Hoover | B01F 7/162 366/143 |
| 4,100,615 A | * | 7/1978 | Thompson | B01F 7/162 366/170.2 |
| 4,101,977 A | * | 7/1978 | Brackman | B01F 7/162 241/282.1 |
| 4,101,978 A | * | 7/1978 | Brackman | B01F 7/162 366/185 |
| 4,106,118 A | * | 8/1978 | Hoover | B01F 7/162 241/97 |
| RE30,649 E | * | 6/1981 | Thompson | B01F 7/162 366/170.2 |
| 4,525,072 A | * | 6/1985 | Giusti | B01F 7/00208 366/149 |
| 4,863,278 A | * | 9/1989 | Otto | A47J 43/046 241/282.2 |
| 5,044,763 A | * | 9/1991 | Otto | A21C 1/141 366/309 |
| 5,249,861 A | * | 10/1993 | Thomson | A01J 25/02 366/194 |
| 2004/0234677 A1 | * | 11/2004 | Sato | B01F 7/00208 427/11 |
| 2006/0158959 A1 | | 7/2006 | Huang | |
| 2008/0080301 A1 | | 4/2008 | Cao | |

FOREIGN PATENT DOCUMENTS

| | | | | |
|---|---|---|---|---|
| DE | 1457295 | | 3/1969 | |
| DE | 1520595 B1 | * | 5/1970 | ................ B01F 7/00 |
| DE | 8813901 | | 12/1988 | |
| DE | 19919519 A1 | * | 11/2000 | ......... B01D 19/0026 |
| DE | 10103029 A1 | * | 7/2002 | .......... B01F 7/00208 |
| EP | 0570335 A1 | * | 11/1993 | ................ B01F 3/12 |
| EP | 0335096 B1 | * | 4/1994 | ......... B01F 7/00208 |
| EP | 0439689 B1 | * | 12/1994 | ......... B01F 7/00275 |
| FR | 2882640 | | 9/2006 | |
| GB | 2124096 A | * | 2/1984 | ........... B01F 7/1665 |
| WO | WO 02066148 A1 | * | 8/2002 | ........... B01F 7/1695 |
| WO | WO 2011116931 A1 | * | 9/2011 | ................ A23G 9/12 |

* cited by examiner

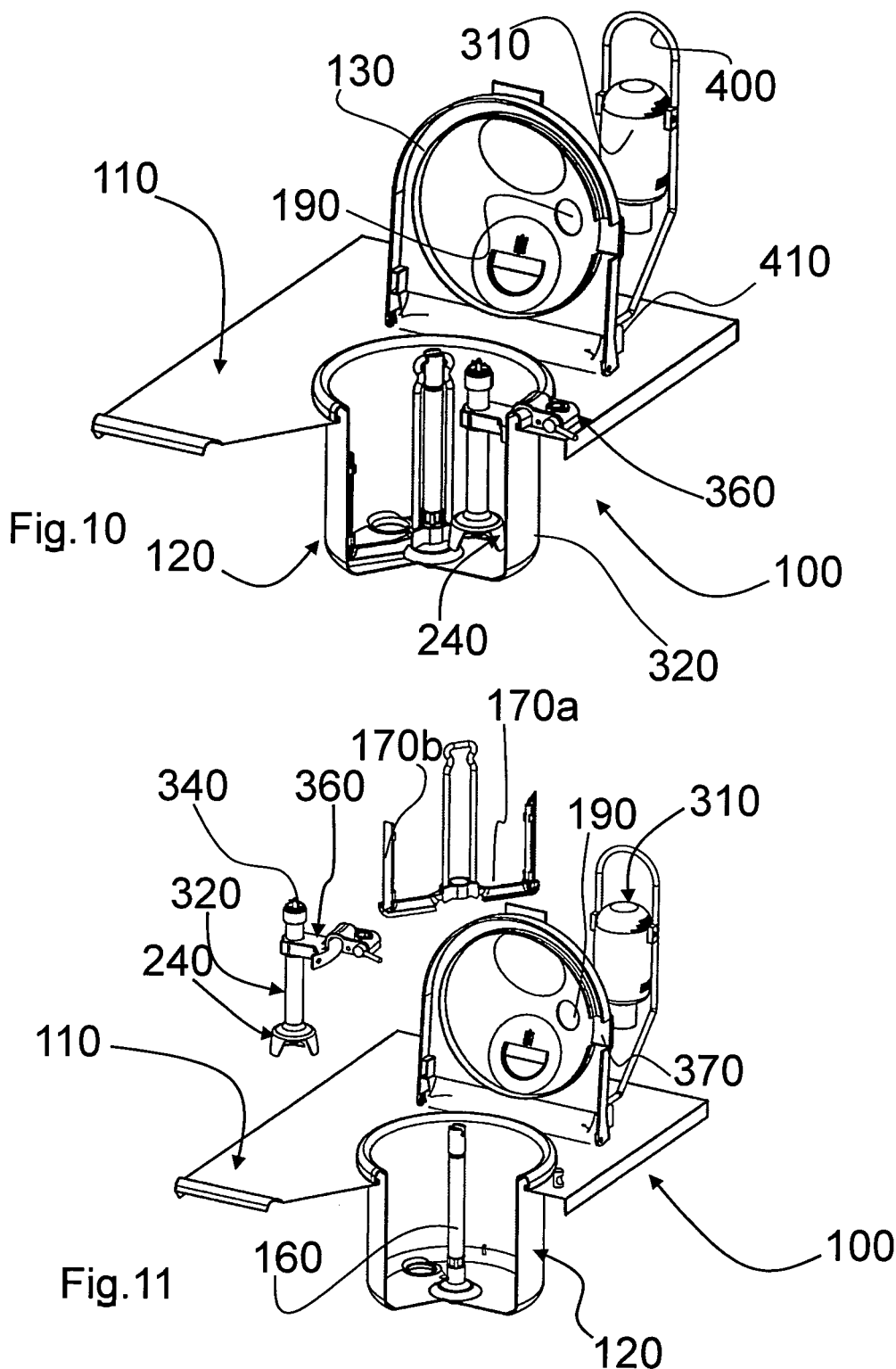

MACHINE FOR THE TREATMENT OF FOOD MIXTURES HAVING SCRAPING AND MIXING BLADES AND A BLENDER DISPOSED PARALLEL THERETO

FIELD OF THE INVENTION

The present invention relates to a machine for the treatment of food mixtures with an improved performance, which mixtures are intended particularly for the production of ice-cream, confectionary and delicatessen products.

BACKGROUND OF THE INVENTION

Currently various machines are used in the field of food mixture processing each one being dedicated to a specific operation. For example, it is necessary to provide a machine intended for treating foodstuff that, later, needs to be subjected in additional machines to heating and cooling phases, or even only to one of the latter. These multiple treatments take place for example in the confectionary and delicatessen industry and also in the homemade-style ice cream industry.

As an exemplification with reference to the latter industry, the homemade-style ice-cream is produced by using a system consisting in the following three steps:
1) pasteurizing the base mix by heating it at a temperature of about +85° C. and by rapidly cooling it at a temperature of about +4° C., for the destruction of the bacterial flora;
2) ageing the pasteurized mix at +4° C. for a suitable period of time, for example 12 hours;
3) whisking the aged mix, by cooling it, until an ice-cream with a solid structure is produced which is taken out from the whisking machine, depending on the situation, at temperatures which may range generally from 8° C. to −11° C.

All this is made into different containers or machines such as a pasteurizer, an ageing bowl and a whisking machine.

Thus it is necessary to have available both machines and related spaces and in addition the mix under treatment has to be moved from one machine to the other one.

All this consequently leads to the fact of handling the various machines both as regards flushing operations and generally as regards cleaning operations.

A specific requirement is for example that of a food mixture that has to be blended into a container and then homogenized and suitably treated before being moved to another container for a following heating and/or cooling and processing phase.

SUMMARY OF THE INVENTION

The general aim of the present invention is to solve the above mentioned drawbacks of the prior art in a very simple, inexpensive and particularly functional manner.

A further aim is to provide a treatment machine able to perform several operations all concentrated in a single machine.

With a view to achieving the above aims, according to the present invention, the intention has been to provide a machine for the treatment of food mixtures having the characteristics described in the annexed claims.

BRIEF DESCRIPTION OF THE INVENTION

The structural and functional characteristics of the present invention and its advantages compared to the prior art will be even more clear and evident from an examination of the following description, with reference to annexed drawings, which show an embodiment of a machine for the treatment of food mixtures made according to the invention.

In the drawings:

FIG. 10 is a perspective view of the machine of FIG. 8 or 9 in the open position, that is with the lid raised;

FIG. 11 is an exploded view of the machine of FIGS. 8-10.

DETAILED DESCRIPTION OF EMBODIMENTS OF THE INVENTION

Figure 1:
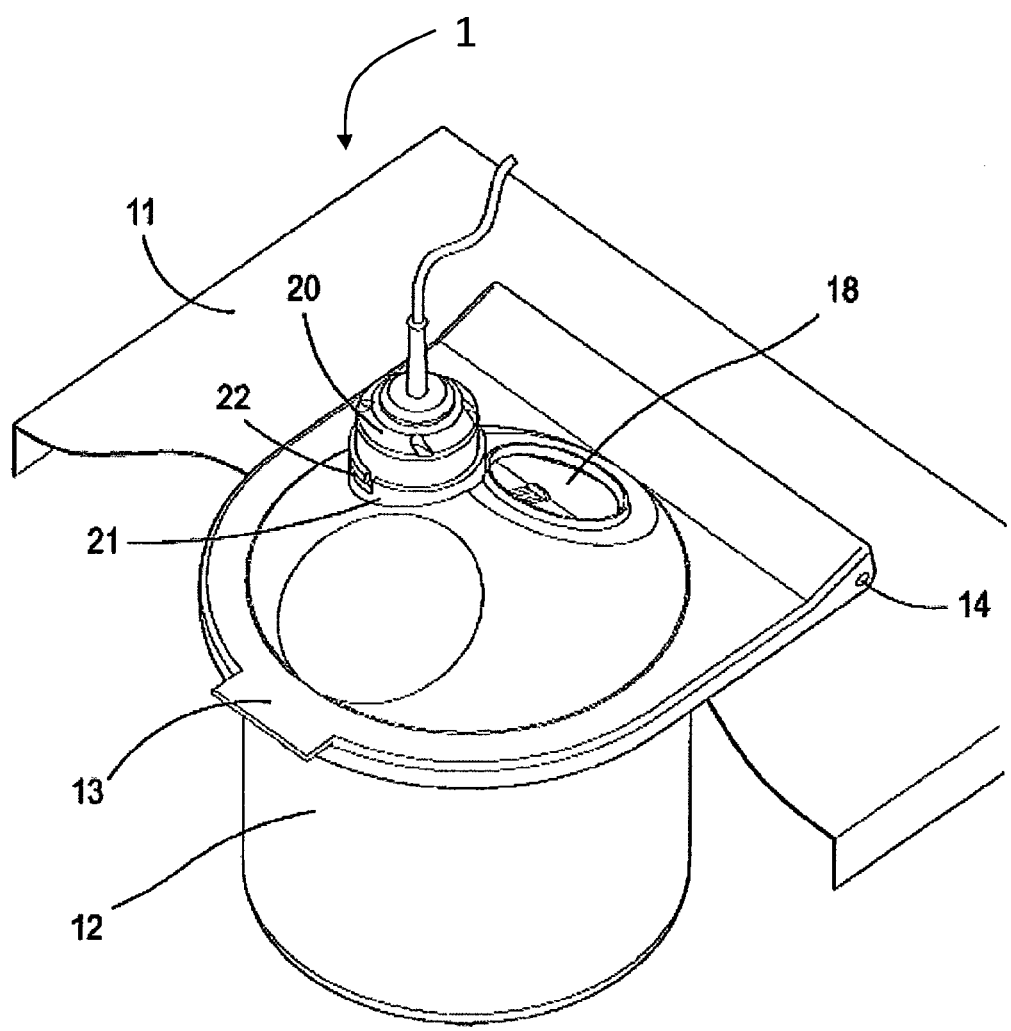
FIG. 1 is a schematic perspective top view of a machine for the treatment of food mixtures made according to the invention in the closed position.
Figure 2:
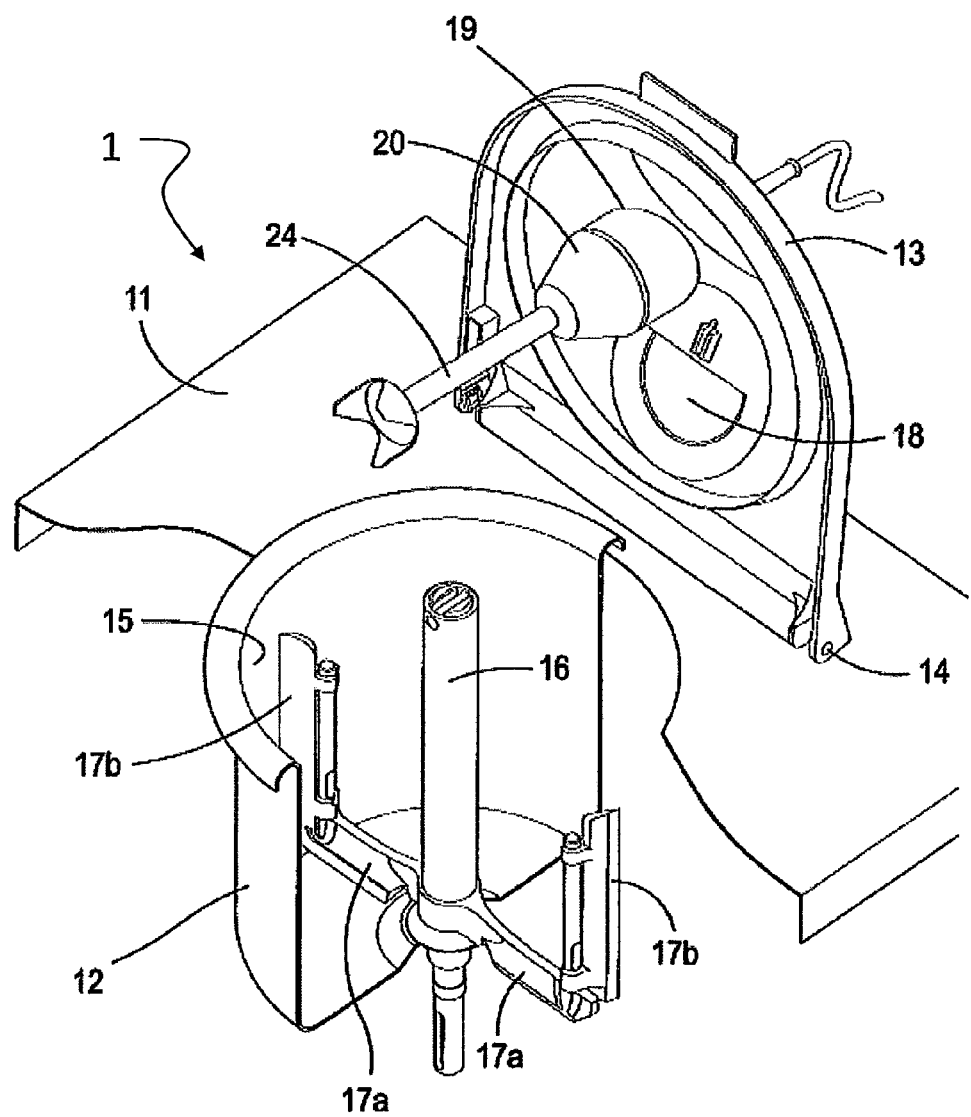
FIG. 2 is a schematic view like FIG. 1 with the machine in the open position, that is with the lid raised.
Figure 3:
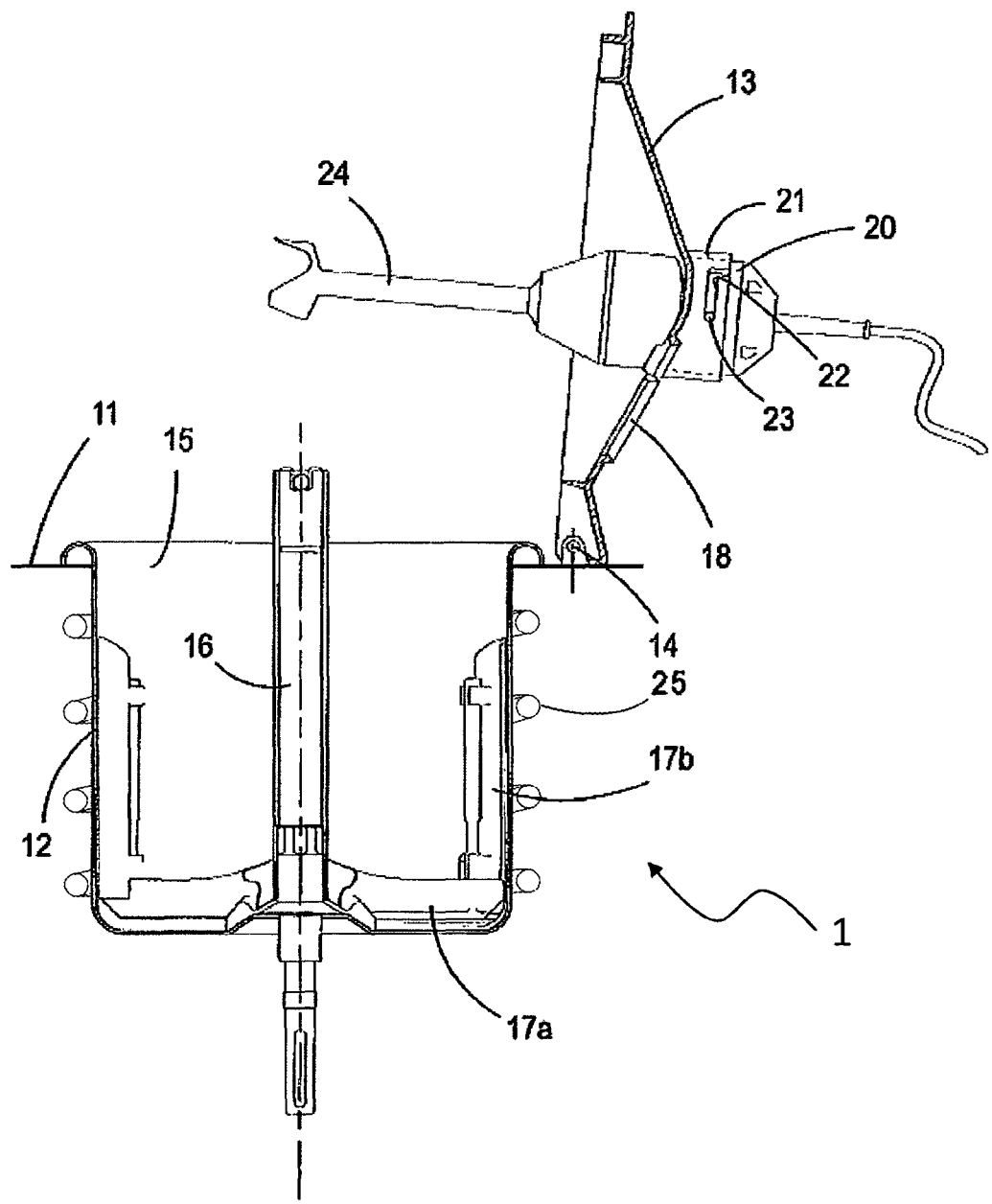
FIG. 3 is a sectional view of the machine in the position of FIG. 2.
Figure 4:
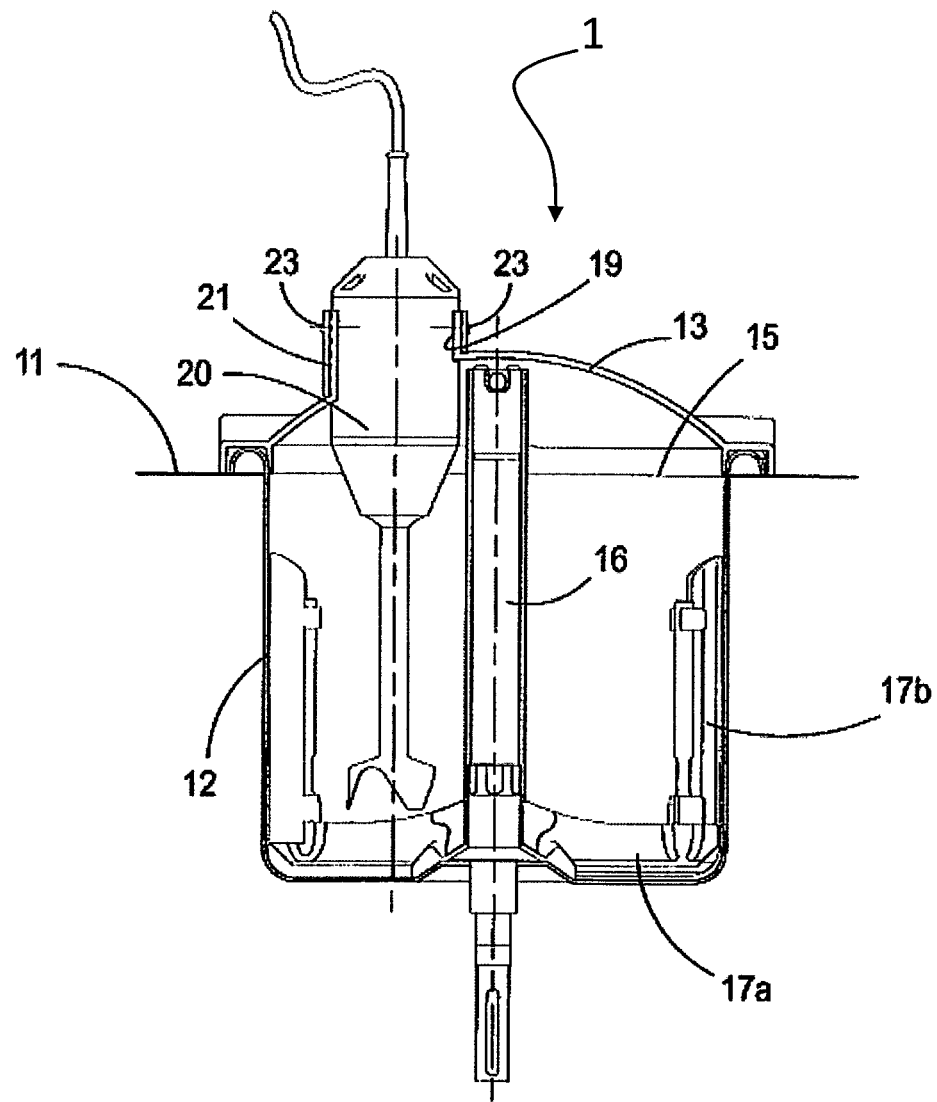
FIG. 4 is a sectional view of the machine in the closed position.

With reference at first to FIGS. 1 to 4, a machine 1 for the treatment of food mixtures with an improved performance is shown, which mixtures are particularly intended for the production of ice-cream, confectionary and delicatessen products, according to the invention.

The machine 1 for the treatment of food mixtures, shown in its distinctive parts, provides a frame outlined and partially shown in 11 wherein a container or cylinder 12 made of steel is arranged for holding the food mixture to be treated.

The container or cylinder 12 is integral with the frame 11 which supports an upper lid 13 hinged thereto, for closing the container or cylinder 12.

Particularly the lid 13 is hinged in 14 to the frame 11 so as to be in a closed or open position on an upper opening 15 of the container or cylinder 12.

Within the container or cylinder 12 there is arranged a rotating shaft 16, coaxial to the container 12, motorized from the bottom by a gear motor (not shown).

The rotating shaft 16 supports in rotation scraping and mixing blades at the bottom 17a and sides 17b of the inner walls and the bottom of the container 12.

According to the invention, the lid 13, in addition to having an inlet 18 for feeding the food product to be treated, is also provided with a further opening 19 wherein a blender 20 is arranged, which is for example of the electric type and completely independently power-supplied. The blender 20 has a longitudinal axis that is generally parallel to the longitudinal axis of the container 12 when connected to lid 13.

In particular the blender 20 is positioned into an extension sleeve 21 situated in correspondence with the opening 19 on the outer wall of the lid and directed towards the outside.

In a preferred embodiment, the extension sleeve 21 provides shaped loops 22 intended to receive pins 23 integral with the body of the blender 20 and directed outwardly.

Thus the blender 20 is positioned so to be freely removable by acting on the bayonet fitting made of the loops 22 of the extension sleeve and of the pins 23 of the blender 20.

This arrangement facilitates the cleaning operations and at the same time allows the blender 20 which is provided with a special agitating blade 24 to be easily replaced by another blender 20 which is similar but with a different blade, if necessary.

Advantageously it may be possible to introduce into the opening 19 another tool for processing the food mixture having the same outer dimensions and connections, if necessary.

Consequently, without the need of moving the food mixture to be treated from one container to another one it is possible advantageously to treat it by different treatment methods.

For example in a first phase it is possible to mince the product and in a second phase to really mix it, for example with a heating and/or cooling action depending on the operation of specific elements arranged coaxially to the outer walls of the container or cylinder 12 or outside the bottom thereof.

The processed product can be taken out by simply rotating the lid 13, as it can be seen in the figures. Thus it is possible to start again the treatment operations within a short time.

As mentioned above, in order to clean the blender 20 or another processing tool it is quickly removed by acting on the bayonet fitting. Vice versa, once the cleaning has been made or for replacement purposes an opposite action is made by restoring the bayonet fitting.

Further variants of what has been described above are also feasible.

Figure 5:
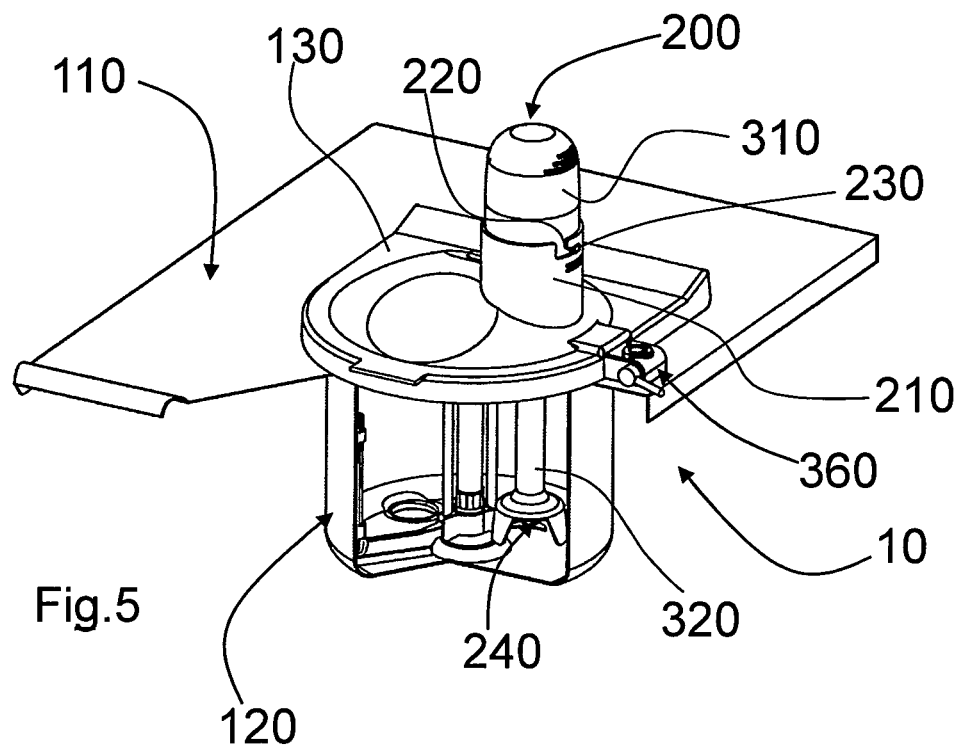
FIG. 5 is a perspective view of a first variant of a machine for the treatment of food mixtures according to the invention, in the closed position, that is with the lid lowered.
Figure 6:
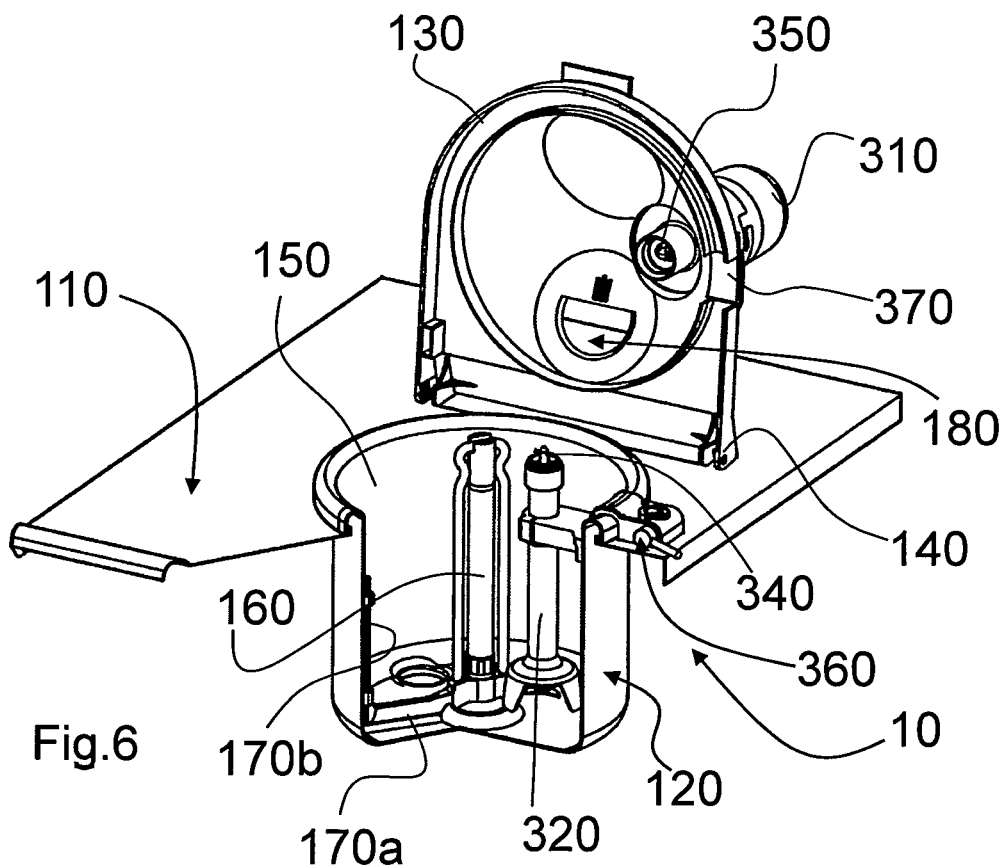
FIG. 6 is a perspective view of the machine of FIG. 5 in the open position, that is with the lid raised.
Figure 7:
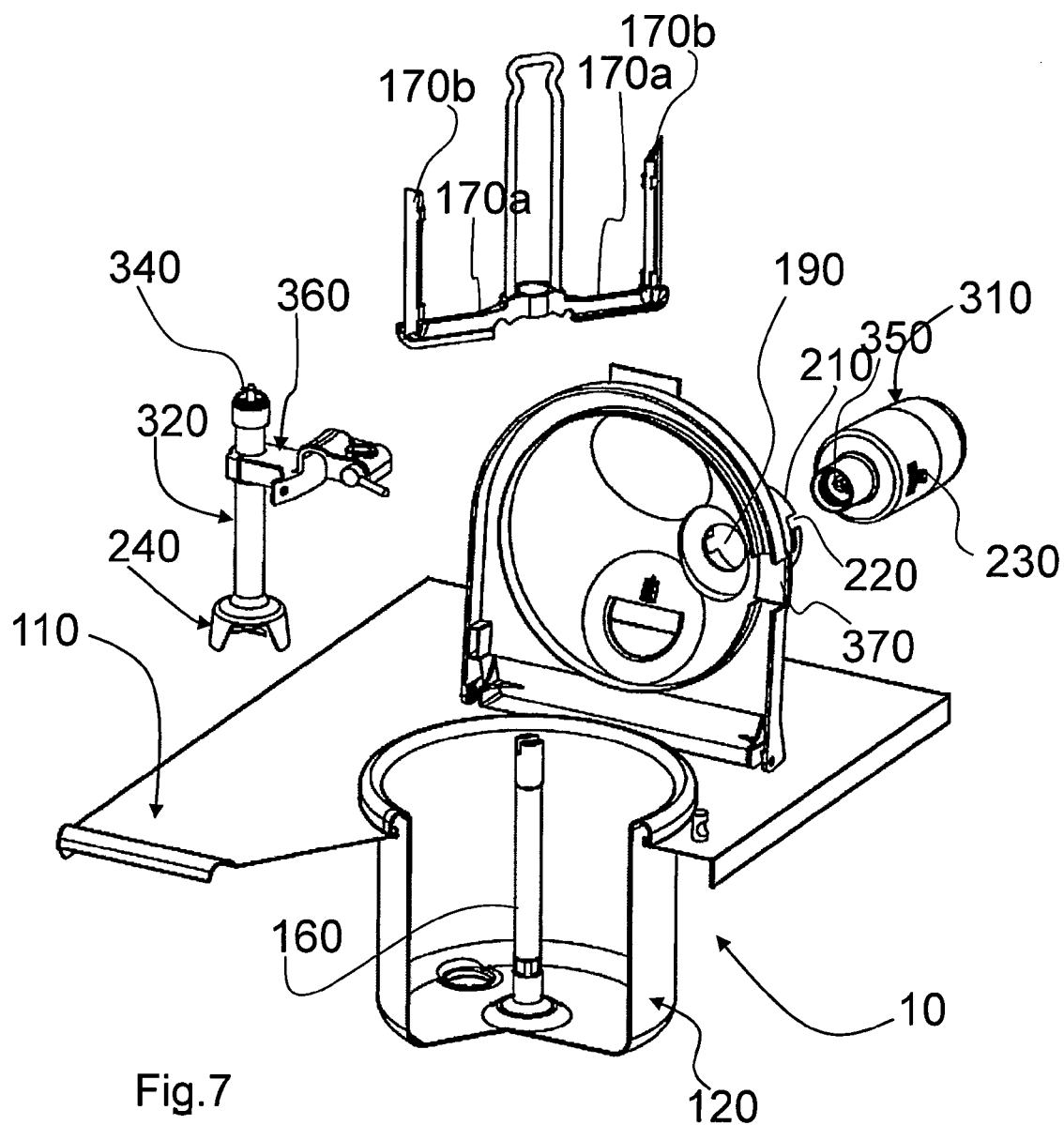
FIG. 7 is an exploded view of the machine of FIGS. 5 and 6.
Figure 8:
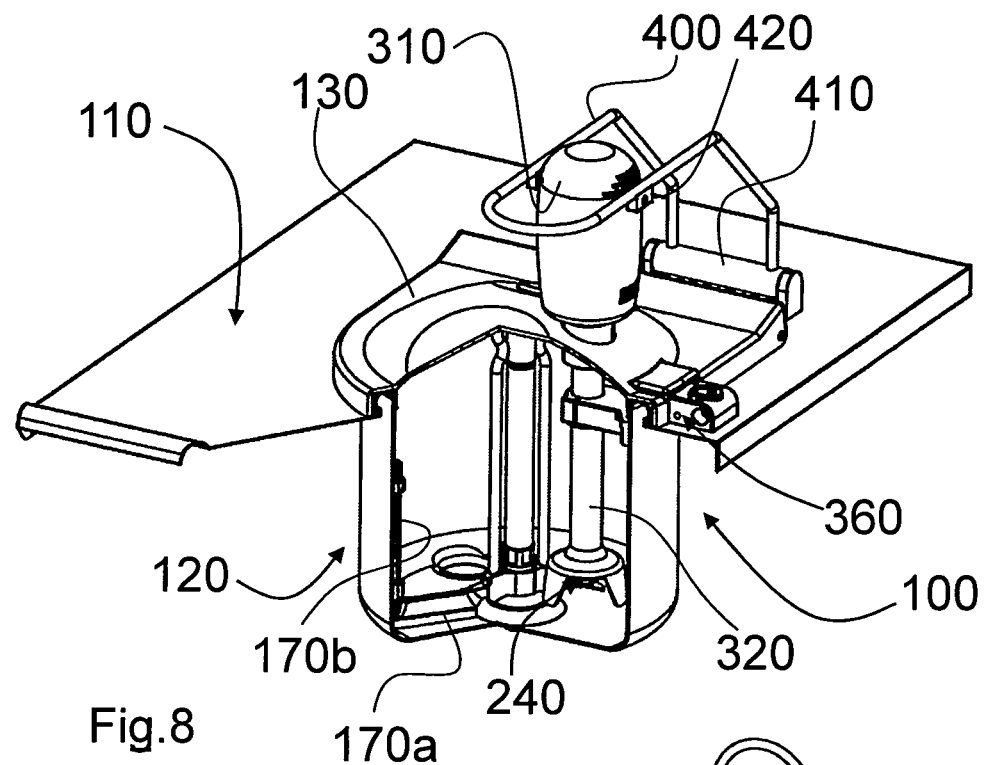
FIG. 8 is a perspective view of a second variant embodiment of a machine for the treatment of food mixtures according to the invention, in the closed position, that is with the lid lowered, according to a first operating configuration.
Figure 9:
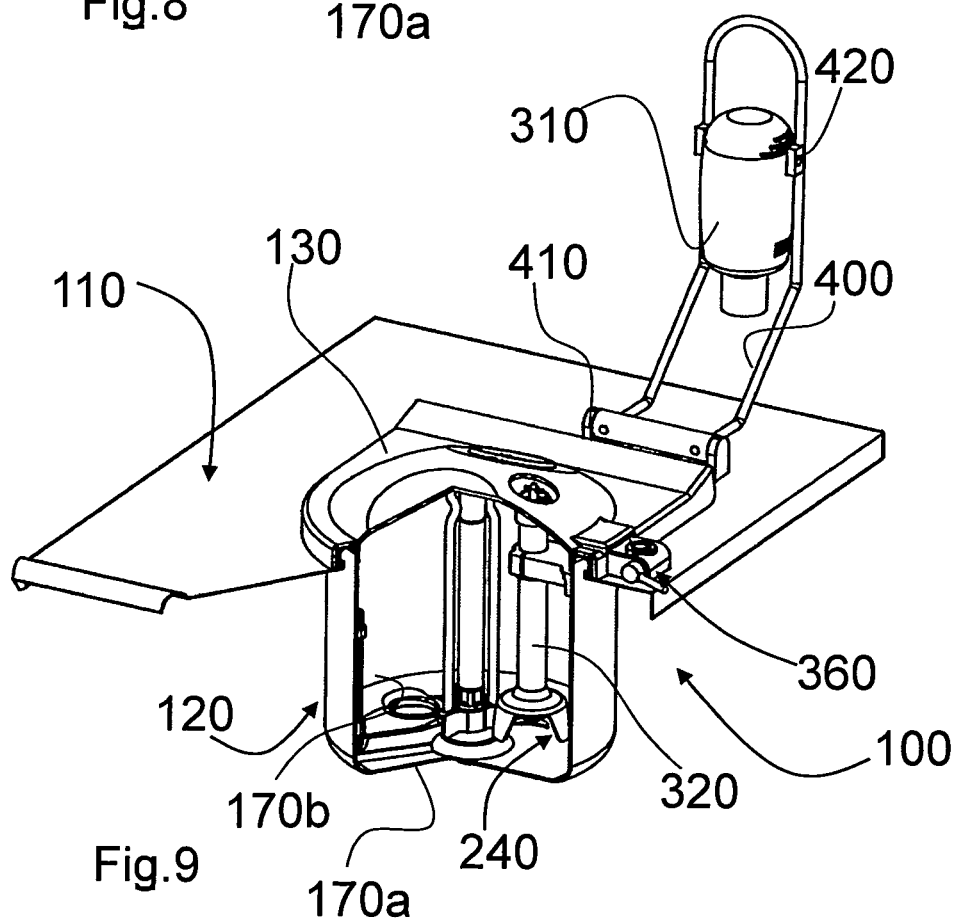
FIG. 9 is a perspective view of the machine of FIG. 8 in the closed position, that is with the lid lowered, but with the motor device lifted, according to a second operating configuration.

Among such variants the first one is shown in FIGS. 5-7, where a variant of the machine 10 for the treatment of food mixtures with an improved performance is shown, according to the present invention.

Food mixtures to which reference is made are those intended particularly for the production of ice-cream, confectionary and delicatessen products.

The machine 1 for the treatment of food mixtures, shown in its distinctive parts, provides a frame outlined and partially shown in 110 wherein a container or cylinder 120 is arranged for holding the food mixture to be treated.

The container or cylinder 120 is integral with the frame 110 which supports an upper lid 130 hinged thereto, for closing the container or cylinder 120.

Particularly the lid 130 is hinged in 140 to the frame 110 so as to be in a closed or open position on an upper opening 150 of the container or cylinder 120.

Within the container or cylinder 120 there is arranged a rotating shaft 160, coaxial to the container 120, motorized from the bottom by a gear motor (not shown).

The rotating shaft 160 supports in rotation scraping and mixing blades at the bottom 170a and sides 170b of the inner walls and the bottom of the container 120.

According to the invention, the lid 130, in addition to have an inlet 180 for feeding the food product to be treated, is also provided with a further opening 190 wherein a portion of a motorized body 310 of a blender 200 can be arranged, which is for example of the electric type and completely independently power-supplied.

More particularly the blender 200 comprises, in addition to the motorized body 310, a shaft 320 which is provided at one end with a suitable tool 240 (by way of example: paddles or blades), moved by an electric motor integrated within the motorized body 310.

The end of the shaft 320 opposite to the one provided with the tool 240 is equipped with a quick mechanical coupling 340 so as it can be engaged with/disengaged from a corresponding power take-off 350 provided at the underside of the motorized body 310, in order to transmit the torque necessary to drive the tool 240.

The shaft 320 is supported in the operating (substantially vertical) position by a quick clamp mounting (called clip) 360 removably attachable to the edge of the cylinder 120.

Thus it has to be noted that the shaft 320 is completely housed within the volume defined by the container 120 when closed by its lid 130.

Such clip 360 partially extends within the container 120 and partially outside it: more particularly within the cylinder it has the sleeve for coupling with the shaft 320 and at the outside it has a driving means, for example a cam provided with a driving lever, by means of which it is removably coupled to the edge of the cylinder 120.

To this end it has to be noted that (FIG. 6) the lid 130 is suitably equipped with a seat 370 wherein the clip 360 is housed when fitted thereto.

It has to be noted that the motorized body 310 of the blender 200 is arranged into an extension sleeve 210 situated in correspondence with the opening 190 on the outer wall of the lid and directed towards the outside.

In a preferred embodiment, the extension sleeve 210 provides shaped loops 220 intended to receive pins 230 integral with the motorized body 310 of the blender 200 and directed outwardly.

It has to be noted that the sleeve 210 acts for centering the motorized body 310, since it guarantees the latter to be properly coupled to the shaft 320 once it is fitted.

Thus the motorized body 310 is positioned so to be freely removable by acting on the bayonet fitting made by the loops 220 of the extension sleeve and by the pins 230.

Thus a machine 10 is achieved wherein the shaft 320 of the blender 200 is coupled to the container 120 and the motorized body 310 of the same blender 200 is coupled to the lid 130 of the container 120.

This arrangement facilitates the cleaning operations and at the same time allows the tool 240 to be easily replaced; in this case it is sufficient to open the lid 130, to release the clip 360 and to replace the shaft 320.

FIG. 6 clearly shows a further advantage: in such position, even with the lid 130 in the open position, the shaft 320 remains in the position fitted into the container 120, and in addition the motorized body 310 is released from the shaft 320.

Advantageously, this leads the machine 10 to have a high intrinsic safety, as when a user raises the lid 130 in order to have access inside the container, at the same time he/she opens the lid 130, he/she disengages the motorized body 310 from the shaft 320, preventing the tool 240 thereof from being accidentally operated when his/her hands are within the container Advantageously it may be possible to introduce into the opening 190 another tool for processing the food mixture having the same outer dimensions and connections, for example mincing blades, whipping blades, dough hook-like tool etc.

Therefore in order to use various tools, the motor 310 will be suitably driven at different operating speeds, suitably selected for each treatment.

Consequently, without the need of moving the food mixture to be treated from one container to another one it is possible advantageously to treat it by different treatment methods.

For example in a first phase it is possible to mince the product and in a second phase to really mix it, for example with a heating and/or cooling action depending on the operation of specific elements arranged outside the container or cylinder 120 or outside the bottom thereof In addition to a mechanical treatment, performed by the blades 170a, 170b, 240 the machine 10 is arranged also for performing a thermal treatment of the mixture within the container 120, it being provided to this end with heating and/or cooling members for said container 120.

For example in order to cool or heat the mixture there are provided coils 25 (see FIG. 3) arranged around the container, wherein a cooling or heating fluid flows.

Such coils can be for example a part of a cooling circuit and/or a heating circuit and are of a type known per se; therefore, they are not described any longer.

Thus the aim mentioned in the preamble of the description is achieved.

Obviously, the shapes of the frame for making a machine for the treatment of food mixtures according to the invention can be different than those shown purely by way of non limitative example in the drawings, the materials and the assembling methods can be different as well.

For example a second variant 100 of the machine is shown in the annexed FIGS. 8-11.

In this second variant 100 the same reference numbers denote the same parts of the first variant, they not being described any longer.

The only difference between the machine 100 and the machine 10 is that the motorized body 310 of the blender 200 is guided in its movement between a position far away from the opening 190 (FIG. 9) and an operating position wherein it is partially fitted into the opening 190, by means of an articulated control arm 400.

To this end the articulated arm 400 comprises a base 410 by means of which it is hinged to the frame 110.

Thus the arm 400, in the shown example, is able to pivot about an horizontal axis substantially parallel to that about which the lid 130 rotates.

The motorized body 310 is rotatably fastened to the articulated arm 400, thus it can be positioned in an easy and quick manner.

For example the motorized body 310 is rotatable about two pins 420 integral thereto and cooperating with corresponding seats of the articulated arm 400.

Thus, optionally, the sleeve 210 can be omitted, since in this case its centering function is carried out by the articulated arm 400, which acts for moving the motorized body such that its portion equipped with the power take-off for the connection to the shaft 320 is properly positioned.

However it has to be noted that the sleeve 210 could be provided anyway, for example in order to improve the connection between the motorized body 310 and the shaft 320.

Thus the aim mentioned in the preamble of the description is achieved.

Obviously, the shapes of the frame structure for making a machine for the treatment of food mixtures according to the invention can be different from those shown purely by way of non limitative example in the drawings, the materials and the assembling methods can be different as well.

The field of protection of the invention is therefore delimited by the annexed claims.

The invention claimed is:

1. A machine for treatment of food mixtures, comprising:
   a container for collecting a food mixture, the container being integral with a frame structure;
   an upper lid for closing the container, the upper lid being coupled to the container and hinged to the frame structure so as to be in a closed or open position on an upper opening of the container;
   a rotating shaft disposed in the container and coaxial with a longitudinal axis of the container, the rotating shaft supporting, in rotation, scraping and mixing blades at a bottom and sides of inner and bottom walls of the container; and
   a blender removably connectable to said lid, at an off-center opening in said lid, said blender having a longitudinal axis generally parallel to the longitudinal axis of said container when connected to said lid,
   wherein said blender is positioned inside an extension sleeve situated in correspondence with the off-center opening on an outer wall of the lid and directed outwardly from said lid.

2. The machine according to claim 1, wherein said treatment is a thermal treatment, and said machine comprises one or more of heating or cooling means for said container.

3. The machine according to claim 1, wherein said blender is connectable so to be freely removable from said lid.

4. The machine according to claim 1, wherein said extension sleeve includes a bayonet fitting.

5. The machine according to claim 4, wherein said bayonet fitting comprises shaped loops situated in the extension sleeve and pins integral with a body of the blender and directed outwardly from said blender.

6. The machine according to claim 1, wherein said blender is provided with at least a motorized body and with a shaft supporting at least a tool, said tool being drivable in rotation by said motorized body through said shaft, said shaft and said motorized body being further associable with each other in order to transmit a motion to said tool, said motorized body being connectable to said lid and said shaft being connectable to said container.

7. The according to claim 6, wherein said shaft supporting said tool is housed within a volume defined by said container when closed by the lid.

8. A machine for treatment of food mixtures, comprising:
   a container for collecting a food mixture, the container being integral with a frame structure;
   an upper lid for closing the container, the upper lid being coupled to the container and hinged to the frame structure so as to be in a closed or open position on an upper opening of the container;
   a rotating shaft disposed in the container and coaxial to the container, the rotating shaft supporting, in rotation, scraping and mixing blades at a bottom and sides of inner and bottom walls of the container;
   a blender removably connectable to said lid, at an opening in said lid, said blender having a longitudinal axis generally parallel to the longitudinal axis of said container when connected to said lid, wherein said blender is provided with at least a motorized body and with a shaft supporting at least a tool, said tool being drivable in rotation by said motorized body through said shaft, said shaft and said motorized body being further associable with each other in order to transmit a motion to said tool, said motorized body being connectable to said lid and said shaft being connectable to said container; and
   a quick clamp mounting, or a clip, removably attachable to said container and intended for removably engaging said shaft supporting said tool.

9. The machine according to claim 8, wherein said quick mounting or clip extends at least partially inside the container and at least partially outside said container, said clip being provided with a sleeve for coupling with said shaft supporting said tool.

10. A machine for treatment of food mixtures, comprising:
- a container for collecting a food mixture, the container being integral with a frame structure;
- an upper lid for closing the container, the upper lid being coupled to the container and hinged to the frame structure so as to be in a closed or open position on an upper opening of the container;
- a rotating shaft disposed in the container and coaxial to the container, the rotating shaft supporting, in rotation, scraping and mixing blades at a bottom and sides of inner and bottom walls of the container;
- a blender removably connectable to said lid, at an opening in said lid, said blender having a longitudinal axis generally parallel to longitudinal axis of said container when connected to said lid, wherein said blender is provided with at least a motorized body and with a shaft supporting at least a tool, said tool being drivable in rotation by said motorized body through said shaft, said shaft and said motorized body being further associable with each other in order to transmit a motion to said tool, said motorized body being connectable to said lid and said shaft being connectable to said container; and
- an articulated arm coupled to said motorized body in order to guide a movement thereof between at least a first position wherein the motorized body is far away from said opening in said lid, and a second position wherein said motorized body is at least partially fitted into said opening in said lid for coupling to said shaft supporting said tool.

* * * * *